(12) United States Patent
Bhatasana

(10) Patent No.: US 11,262,228 B2
(45) Date of Patent: Mar. 1, 2022

(54) SYSTEMS AND METHODS FOR DERIVING FIELD PROVER BASE VOLUME FROM MASTER PROVER BASE VOLUME

(71) Applicant: Saudi Arabian Oil Company, Dhahran (SA)

(72) Inventor: Chandulal N. Bhatasana, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 186 days.

(21) Appl. No.: 16/571,627

(22) Filed: Sep. 16, 2019

(65) Prior Publication Data

US 2021/0080307 A1    Mar. 18, 2021

(51) Int. Cl.
    *G01F 17/00*    (2006.01)
    *G01F 25/00*    (2006.01)
    *F02M 65/00*    (2006.01)

(52) U.S. Cl.
    CPC ........... *G01F 17/00* (2013.01); *F02M 65/001* (2013.01); *G01F 25/003* (2013.01);
    (Continued)

(58) Field of Classification Search
    CPC .. G01F 17/00; G01F 25/0007; G01F 25/0092; G01F 25/003; G01F 25/0038; F02M 65/001
    (Continued)

(56) References Cited

U.S. PATENT DOCUMENTS 5,455,781 A * 10/1995 Reynal ................... G01F 25/003
    700/282
6,629,447 B1 * 10/2003 Collins ............... G01F 25/0007
    73/1.16

(Continued)

FOREIGN PATENT DOCUMENTS

GB    2250824 B    9/1994

OTHER PUBLICATIONS

Williams, G.. "Fundamentals of Meter Provers and Proving Methods." (2015), 9 pages (Year: 2015).*

(Continued)

*Primary Examiner* — Clayton E. LaBalle
*Assistant Examiner* — Kevin C Butler
(74) *Attorney, Agent, or Firm* — Bracewell LLP; Constance G. Rhebergen; Linda L. Morgan

(57) ABSTRACT

Methods and systems for determining a base field prover volume of a field prover include connecting together a transfer meter assembly, a master prover, and the field prover in series. A flow of fluid at a first flow rate is provided and a calibration sequence is performed at the flow rate. The calibration sequence includes counting pulses generated by the transfer meter assembly over a duration of each pass of the master prover and a pass of the field prover. An intermediate calibrated field prover volume is determined from a ratio of the field prover pulse count to the average master prover pulse count, multiplied by a base master prover volume. The calibration sequence can be repeated to provide at least three intermediate calibrated field prover volumes at the first flow rate. The calibration sequence can be repeated at different flow rates to arrive at the base field prover volume.

20 Claims, 5 Drawing Sheets

(52) U.S. Cl.
CPC ...... *G01F 25/0007* (2013.01); *G01F 25/0038* (2013.01); *G01F 25/0092* (2013.01)

(58) Field of Classification Search
USPC .......................................................... 73/1.36
See application file for complete search history.

(56) References Cited

U.S. PATENT DOCUMENTS

| | | | | |
|---|---|---|---|---|
| 7,028,528 | B2* | 4/2006 | Antonijevic | G01F 1/8472 |
| | | | | 73/1.16 |
| 7,366,625 | B1* | 4/2008 | Augenstein | G01F 25/0007 |
| | | | | 702/100 |
| 7,373,798 | B2* | 5/2008 | Cotton | G01F 1/667 |
| | | | | 73/1.34 |
| 7,624,616 | B2* | 12/2009 | Freund, Jr | G01F 25/0007 |
| | | | | 73/1.34 |
| 8,511,138 | B2* | 8/2013 | Larsen | G01F 25/0015 |
| | | | | 73/1.19 |
| 8,826,717 | B2* | 9/2014 | Van Bekkum | G01F 25/0015 |
| | | | | 73/1.22 |
| 9,322,698 | B2* | 4/2016 | Cotton | G01F 25/0007 |
| 9,482,563 | B2* | 11/2016 | Calderin | G01F 1/34 |
| 9,489,484 | B2* | 11/2016 | van Dal | G06F 19/00 |
| 2010/0223976 | A1* | 9/2010 | Jakubenas | G01F 25/003 |
| | | | | 73/1.16 |
| 2021/0080307 | A1* | 3/2021 | Bhatasana | G01F 25/0007 |

OTHER PUBLICATIONS

Manual of Petroleum Measurement Standards Chapter 4—Proving Systems, American Petroleum Institute (API MPMS 4.9.3 Chapter 4 Section 9 Part 3, Apr. 2010, 24 pages (Year: 2010).*

American Petroleum Institute (API) Standards Catalog 3rd Edition, Petroleum Measurement, www.api.org/standards, Aug. 2013, 24 pages (Year: 2013).*

American Petroleum Institute (API) Standards Chapter 11—Physical Propertieds Data Section 1—Temperature and Pressure Volume, Petroleum Measurement, www.api.org/standards, Sep. 2007, 10 pages (Year: 2007).*

American Petroleum Institute (API) Standards Chapter 4.5 Master Meter Provers, Petroleum Measurement, www.api.org/standards, Nov. 2011, 10 page (Year: 2011).*

American Petroleum Institute (API) Standards Catalog 1st Edition, Chapter 14—Natural Gas Fluids Measurement Section 10 Measurement of Flow to Flares, www.api.org/standards, Aug. 2013, 66 pages (Year: 2013).*

AP 42, Fifth Edition, vol. I, Chapter 7: Liquid Storage Tanks—US EPA, Mar. 2020, 203 pages (Year: 2020).*

"Manual of Petroleum Measurement Standards" Chapter 4—Proving Systems, Section 9—Methods of Calibration for Dispacement and Volumetric Tank Provers; Part 3; American Petroleum Institute, First Edition, Apr. 2010; p. 1-24.

International Search Report and Written Opinion for related PCT application PCT/US2020/050923 dated Dec. 17, 2020, pp. 1-17.

Eason L.F.; "Gravimetric Calibration of Vlumetric Standards with Capacities Exeeding Five Gallons", NCSL International Measure: The Journal of Measurement Science, vol. 1 No. 4; Dec. 2006; pp. 60-72.

* cited by examiner

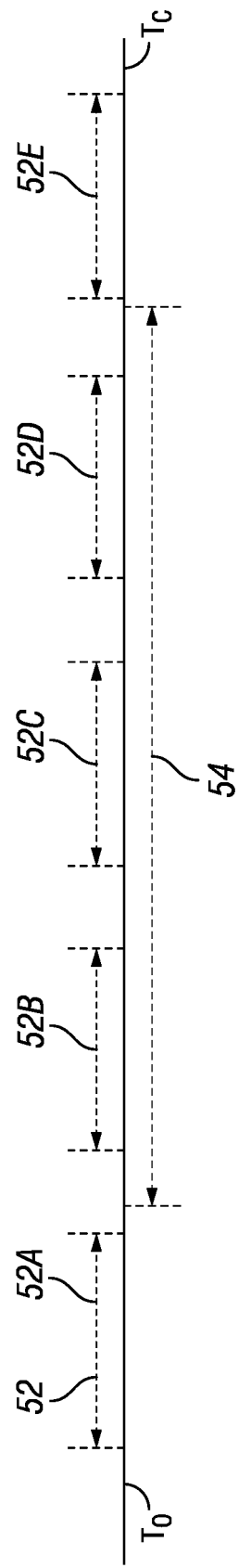

SYSTEMS AND METHODS FOR DERIVING FIELD PROVER BASE VOLUME FROM MASTER PROVER BASE VOLUME

BACKGROUND

1. Field of the Disclosure

The present disclosure relates in general to measuring the flow of hydrocarbons within a pipeline, and more particularly to determining a base volume of a field prover used to verify the accuracy of flow meters.

2. Description of the Related Art

In typical pipeline systems that transport various liquid hydrocarbon, for example at marine terminals where liquid hydrocarbon is loaded onto vessels as cargo, it is important to measure the flow of hydrocarbons accurately as ownership of the hydrocarbon commodity changes and a dollar value is assigned to the volume of hydrocarbon. The accuracy of the flow meter, which can be known as a custody meter, used to measure the volume of the hydrocarbon, such as turbine meter, positive displacement meter, liquid ultrasonic meter, or other known metering device, can be affected by a variation in characteristic of fluid to be measured, changes in operating process conditions, life cycle of the flow meter, and other external conditions. A meter prover can be used to check the accuracy of the flow meter by deriving a meter factor. When the meter proving system is being operated, the entire flow of fluids from the custody transfer flow meter is diverted through the prover.

A typical displacement prover has a length of pipe through which the displacer travels back and forth, actuating a detector at each end of the calibrated section. The prover computer starts totalizing the fluid flow when the displacer passes through the detecting point at one end of the calibration section and stops totalizing when the displacer passes through the detector at the other end of the calibration section. The known volume between two detection points is known as base prover volume (BPV).

The flow meter reading for the time required for the displacer to travel between the detecting points is also determined. The reading from the flow meter is then compared with the base prover volume to provide an accurate meter factor. Therefore, the accuracy of meter factor directly depends on accuracy of the determination of the base prover volume of the displacement prover.

Meter proving systems in the U.S. and internationally, in general, can be guided by The American Petroleum Institute (API) Manual of Petroleum Measurement Standards, Chapter 4, Section 2—Displacement Provers, Third Edition, Reaffirmed in March 2011. Prover calibration methods and calculations are guided by Chapter 12—Calculation of Petroleum Quantities, Section 2—Calculation of Petroleum Quantities Using Dynamic Measurement Methods. Part 4 is directed to Calculation of Base Prover Volumes by the Water draw Method, and Part 5 is directed to Calculation of Base Prover Volume by Master Meter Method (hereafter these standards shall be referred as API MPMS Chap 12.2.4 and API MPMS Chap 12.2.5 respectively).

API MPMS Chap 12.2.4 provides the calculations for waterdraw methods to determine a base prover volume. The waterdraw method uses the principle of displacement of water from the prover into field standard test measures. API MPMS Chap 12.2.5 provides the calculations for the master meter method to determine the base prover volume of a field prover. The master meter in this method is proved by a master prover. Subsequently the master meter is used to determine the base volume of the field displacement prover. To ensure that the master meter performance is not deviated, the master meter is again proved using the master prover. Each of these steps are performed sequentially.

A displacement prover is required to be calibrated every time detector switches are repaired or replaced. The displacement prover cannot be operated until it is reaffirmed by calibration that the prover volume has not changed or if changed, a new volume is determined.

SUMMARY OF THE DISCLOSURE

Embodiments of this disclosure provide systems and methods for determining a base prover volume of a field displacement prover from a base prover volume of a master prover and the use of a transfer meter assembly, and operating the transfer meter assembly, the field displacement prover, and the master prover simultaneously in series. By operating the transfer meter assembly, the field displacement prover, and the master prover simultaneously in series, the time required to determine the base prover volume of the field displacement prover is shortened and the number of calculations required to arrive at the base prover volume of the field displacement prover is reduced compared to currently available methods and the uncertainty in the base prover volume for field prover is reduced by using multiple transfer meters.

In an embodiment of this disclosure, a method for determining a base field prover volume of a field prover includes connecting together a transfer meter assembly, a master prover, and the field prover in fluid communication in series. A flow of fluid at a first flow rate is provided through the transfer meter assembly, the master prover, and the field prover. A calibration sequence is performed at the first flow rate. The calibration sequence includes counting pulses generated by the transfer meter assembly with a first pulse counter over a duration of each pass of two or more passes of the master prover, determining an average master prover pulse count of the pulses generated by the transfer meter assembly over the duration of each pass of two or more passes of the master prover, counting pulses generated by the transfer meter assembly with a second pulse counter over a duration of a pass of the field prover to determine a field prover pulse count, and calculating an intermediate calibrated field prover volume from a ratio of the field prover pulse count to the average master prover pulse count, multiplied by a base master prover volume. The performing of the calibration sequence is repeated at the first flow rate at least three times and the intermediate calibrated field prover volume at the first flow rate is provided for each of the calibration sequences to provide at least three intermediate calibrated field prover volumes at the first flow rate. A first calibrated field prover volume is calculated from an average of each of the at least three intermediate calibrated field prover volumes at the first flow rate. The calibration sequence is performed at a second flow rate, where a percentage difference between the second flow rate and the first flow rate is at least 25%. The performing of the calibration sequence is repeated at the second flow rate at least three times and the intermediate calibrated field prover volume is provided at the second flow rate for each of the calibration sequences to provide at least three intermediate calibrated field prover volumes at the second flow rate. A second calibrated field prover volume is calculated from the average of each of the at least three intermediate calibrated field prover volumes at the second flow rate. The calibration sequence is performed at a third flow rate, where a percentage difference between the third flow rate and the second flow rate is at least 25%. The performing of the calibration sequence is repeated at the third flow rate at least three times and the intermediate calibrated field prover volume is provided at the third flow rate for each of the calibration sequences to provide at least three intermediate calibrated field prover volumes at the third flow rate. A third calibrated field prover volume is calculated from the average of each of the at least three intermediate calibrated field prover volumes at the third flow rate. A provisional field prover base volume is determined from the average of the first calibrated field prover volume, the second calibrated field prover volume, and the third calibrated field prover volume. A field prover base volume is determined from the provisional field prover base volume.

In alternate embodiments, the calibration sequence can further include measuring a master prover temperature of the fluid at the master prover, measuring a master prover pressure of the fluid at the master prover, measuring a field prover temperature of the fluid at the field prover, and measuring a field prover pressure of the fluid at the field prover. Calculating the intermediate calibrated field prover volume can include adjusting the intermediate calculated field prover volume with the master prover temperature, the master prover pressure, the field prover temperature and the field prover pressure.

In other alternate embodiments, the transfer meter assembly can include two or more transfer meters. Counting pulses generated by the transfer meter assembly can include counting pulses generated by each of the transfer meters of the transfer meter assembly with the first pulse counter over the duration of each pass of two or more passes of the master prover. Determining the average master prover pulse count of the pulses generated by the transfer meter assembly can include determining a separate average master prover pulse count by each of the transfer meters of the transfer meter assembly over the duration of each pass of two or more passes of the master prover. Counting pulses generated by the transfer meter assembly with the second pulse counter can include counting pulses generated by each of the transfer meters of the transfer meter assembly with the second pulse counter over the duration of the pass of the field prover to determine a separate field prover pulse count from each of the transfer meters of the transfer meter assembly. Calculating the intermediate calibrated field prover volume can include calculating a separate intermediate calibrated field prover volume from each transfer meter of the transfer meter assembly from a ratio of the field prover pulse count to average master prover pulse count from such transfer meter, multiplied by the base master prover volume, so that a number of calculated intermediate calibrated field prover volumes is equal to a number of transfer meters of the transfer meter assembly. Calculating the first calibrated field prover volume can include calculating a separate first calibrated field prover volume from the average of each of the at least three intermediate calibrated field prover volumes at the first flow rate from each transfer meter of the transfer meter assembly. Calculating the second calibrated field prover volume can include calculating a separate second calibrated field prover volume from the average of each of the at least three intermediate calibrated field prover volumes at the second flow rate from each transfer meter of the transfer meter assembly. Calculating the third calibrated field prover volume can include calculating a separate third calibrated field prover volume from the average of each of the at least three intermediate calibrated field prover volumes at the third flow rate from each transfer meter of the transfer meter assembly. Determining the provisional field prover base volume can include determining a separate provisional field prover base volume from the average of the first calibrated field prover volume, the second calibrated field prover volume, and the third calibrated field prover volume from each transfer meter of the transfer meter assembly. Determining the field prover base volume from the provisional field prover base volume can include determining the field prover base volume from the average of the provisional field prover base volume from each transfer meter of the transfer meter assembly.

In yet alternate embodiments, the method can further include, before calculating the intermediate calibrated field prover volume, calculating a percentage difference in pulse counts from the transfer meter assembly by the first pulse counter to arrive at a repeatability transfer meter value and determining if the repeatability transfer meter value is within a required transfer meter repeatability tolerance. If the repeatability transfer meter value is outside of the required transfer meter repeatability tolerance for a flow rate, then the performing of the calibration sequence can be repeated at such flow rate.

In still other alternate embodiments, the method can further include calculating a percentage difference in the intermediate calibrated field prover volume for consecutive calibration sequences to arrive at a repeatability intermediate value and determining if the repeatability intermediate value is within a required intermediate value repeatability tolerance. If the repeatability intermediate value is outside of the required intermediate value repeatability tolerance for a flow rate, then the performing of the calibration sequence can be repeated at such flow rate. Before determining a provisional field prover base volume a percentage difference between a largest value of the first calibrated field prover volume, the second calibrated field prover volume, and the third calibrated field prover volume, and a smallest value of the first calibrated field prover volume, the second calibrated field prover volume, and the third calibrated field prover volume can be calculated, to arrive at a repeatability calibrated value and determining if the repeatability calibrated value is within a required calibrated value repeatability tolerance.

In still other alternate embodiments, if the repeatability calibrated value is outside of the required calibrated value repeatability tolerance for a flow rate, then the flow rate can be changed by at least 25% to provide a changed flow rate and performing the calibration sequence at the changed flow rate. Counting pulses with the first pulse counter over the duration of each pass of two or more passes of the master prover can include counting pulses with the first pulse counter over a duration of at least two passes of the master prover. Counting pulses with the first pulse counter over the duration of each pass of two or more passes of the master prover can occur within the duration of the pass of the field prover.

In an alternate embodiment, a method for determining a base field prover volume of a field prover includes the steps of:

A—providing a first flow rate of a fluid flow through a prover calibration system, the prover calibration system including a transfer meter assembly, a master prover, and the field prover in fluid communication in series, where the transfer meter assembly includes at least one transfer meters;

B—counting pulses generated by each of the transfer meters separately with a first pulse counter over a duration of each pass of two or more forward passes of the master prover;

C—determining an average master forward prover pulse count of the pulses generated by each of the transfer meters separately over the duration of each pass of two or more forward passes of the master prover;

D—counting pulses generated by each of the transfer meters separately with a second pulse counter over a duration of a forward pass of the field prover to determine a field prover forward pulse count for each of the transfer meters;

E—counting pulses generated by each of the transfer meters separately with a first pulse counter over a duration of each pass of two or more back passes of the master prover;

F—determining an average master back prover pulse count of the pulses generated by each of the transfer meters separately over the duration of each pass of two or more back passes of the master prover;

G—counting pulses generated by each of the transfer meters separately with the second pulse counter over a duration of a back pass of the field prover to determine a field prover back pulse count for each of the transfer meters;

H—calculating a percentage difference in pulse counts from the first pulse counter for each of the transfer meters to arrive at a separate repeatability transfer meter value for each of the transfer meters and determining if each of the separate repeatability transfer meter values is within a required transfer meter repeatability tolerance I—calculating a separate forward intermediate calibrated field prover volume from each of the transfer meters from a ratio of the field prover forward pulse count to the average master forward prover pulse count for such transfer meter, multiplied by a base master prover volume;

J—calculating a separate back intermediate calibrated field prover volume from each of the transfer meters from a ratio of the field prover back pulse count to the average master back prover pulse count for such transfer meter, multiplied by the base master prover volume;

K—determining a separate average intermediate calibrated field prover volume from each of the transfer meters by addition of the forward intermediate calibrated field prover volume and the back intermediate calibrated field prover volume for such transfer meter;

L—repeating steps B-K at the first flow rate at least three times and providing the separate average intermediate calibrated field prover volume from each transfer meter at the first flow rate for each of the calibration sequences to provide at least three average intermediate calibrated field prover volumes at the first flow rate for each transfer meter;

M—calculating a percentage difference in the separate average intermediate calibrated field prover volume for each transfer meter for consecutive calibration sequences to arrive at a repeatability intermediate value for each transfer meter and determining if the repeatability intermediate value for each transfer meter is within a required intermediate value repeatability tolerance;

N—calculating a separate first calibrated field prover volume for each transfer meter from an average of each of the at least three average intermediate calibrated field prover volumes for each transfer meter at the first flow rate;

O—repeating steps B-M at a second flow rate, where a percentage difference between the second flow rate and the first flow rate is at least 25%;

P—calculating a separate second calibrated field prover volume for each transfer meter from the average of each of the at least three average intermediate calibrated field prover volumes for each transfer meter at the second flow rate;

Q—repeating steps B-M at a third flow rate, where a percentage difference between the third flow rate and the second flow rate is at least 25%;

R—calculating a separate third calibrated field prover volume for each transfer meter from the average of each of the at least three average intermediate calibrated field prover volumes for each transfer meter at the third flow rate;

S—calculating a separate percentage difference between a largest value of the first calibrated field prover volume, the second calibrated field prover volume, and the third calibrated field prover volume from each transfer meter, and a smallest value of the first calibrated field prover volume, the second calibrated field prover volume, and the third calibrated field prover volume from each transfer meter, to arrive at a separate repeatability calibrated value for each transfer meter and determining if the repeatability calibrated value for each transfer meter is within a required calibrated value repeatability tolerance;

T—determining a separate provisional field prover base volume from the average of the first calibrated field prover volume, the second calibrated field prover volume, and the third calibrated field prover volume from each transfer meter; and U—determining a field prover base volume by calculating the average of each separate provisional field prover base volume from each transfer meter.

In alternate embodiments, the method can further include measuring a master prover temperature of the fluid at the master prover, measuring a master prover pressure of the fluid at the master prover, measuring a field prover temperature of the fluid at the field prover, and measuring a field prover pressure of the fluid at the field prover. Step I can include adjusting each separate forward intermediate calibrated field prover volume with the master prover temperature, the master prover pressure, the field prover temperature, and the field prover pressure. Step J can include adjusting each separate back intermediate calibrated field prover volume with the master prover temperature, the master prover pressure, the field prover temperature, and the field prover pressure.

In other alternate embodiments, if the repeatability transfer meter value for any of the transfer meters is outside of the required transfer meter repeatability tolerance for a flow rate, then Steps B-G can be repeated. If the repeatability intermediate value for any transfer meter is outside of the required intermediate value repeatability tolerance for a flow rate, then Steps B-L can be repeated for such flow rate. If the repeatability calibrated value for any transfer meter is outside of the required calibrated value repeatability tolerance for a flow rate, then the flow rate can be changed by at least 25% to provide a changed flow rate and performing Steps B-R at the changed flow rate.

In another alternate embodiment of this disclosure, a system for determining a base field prover volume of a field prover includes a transfer meter assembly, the transfer meter assembly having at least one transfer meter. A master prover is connected in fluid communication in series with the transfer meter assembly. A field prover is connected in fluid communication in series with the master prover. A data acquisition system has a first pulse counter and a second pulse counter. The first pulse counter is operable to count pulses generated by the transfer meter assembly over a duration of each pass of two or more passes of the master prover. The second pulse counter is operable to count pulses generated by the transfer meter assembly over a duration of a pass of the field prover. A master prover pressure transmitter is operable to detect a pressure of a fluid of the master prover and transmit the pressure of the fluid of the master prover to the data acquisition system. A master prover temperature transmitter is operable to detect and transmit a temperature of the fluid of the master prover and transmit the temperature of the fluid of the master prover to the data acquisition system. A field prover pressure transmitter is operable to detect a pressure of a fluid of the field prover and transmit the pressure of the fluid of the field prover to the data acquisition system. A field prover temperature transmitter is operable to detect a temperature of the fluid of the field prover and transmit the temperature of the fluid of the field prover to the data acquisition system.

In alternate embodiments, the transfer meter assembly can include two or more transfer meters connected in series.

BRIEF DESCRIPTION OF THE DRAWINGS

So that the manner in which the above-recited features, aspects and advantages of the disclosure, as well as others that will become apparent, are attained and can be understood in detail, a more particular description of the embodiments of the disclosure briefly summarized above may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

FIG. 5 is a timeline showing passes of the master prover and field prover of a prover system, in accordance with an embodiment of this disclosure.

DETAILED DESCRIPTION

The Specification, which includes the Summary of Disclosure, Brief Description of the Drawings and the Detailed Description, and the appended Claims refer to particular features (including process or method steps) of the disclosure. Those of skill in the art understand that the disclosure includes all possible combinations and uses of particular features described in the Specification. Those of skill in the art understand that the disclosure is not limited to or by the description of embodiments given in the Specification. The inventive subject matter is not restricted except only in the spirit of the Specification and appended Claims.

Those of skill in the art also understand that the terminology used for describing particular embodiments does not limit the scope or breadth of the disclosure. In interpreting the Specification and appended Claims, all terms should be interpreted in the broadest possible manner consistent with the context of each term. All technical and scientific terms used in the Specification and appended Claims have the same meaning as commonly understood by one of ordinary skill in the art to which this disclosure relates unless defined otherwise.

As used in the Specification and appended Claims, the singular forms "a", "an", and "the" include plural references unless the context clearly indicates otherwise. As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Spatial terms describe the relative position of an object or a group of objects relative to another object or group of objects. The spatial relationships apply along vertical and horizontal axes. Orientation and relational words including "uphole" and "downhole"; "above" and "below" and other like terms are for descriptive convenience and are not limiting unless otherwise indicated.

Where the Specification or the appended Claims provide a range of values, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the Specification and appended Claims to a method comprising two or more defined steps, the defined steps can be carried out in any order or simultaneously except where the context excludes that possibility.

Figure 1:
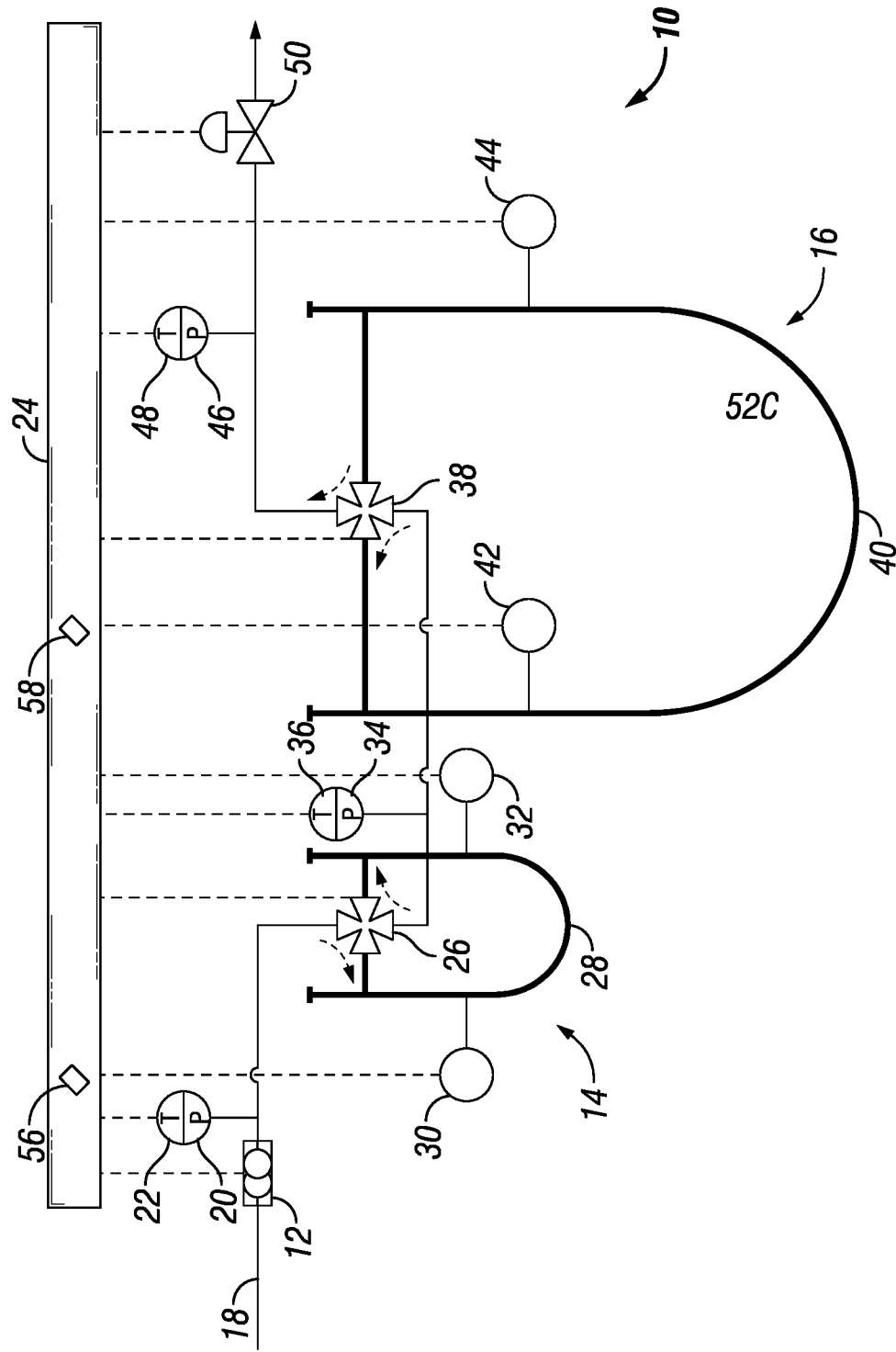
FIG. 1 is a schematic diagram of a prover calibration system in accordance with an embodiment of this disclosure.
Figure 2:
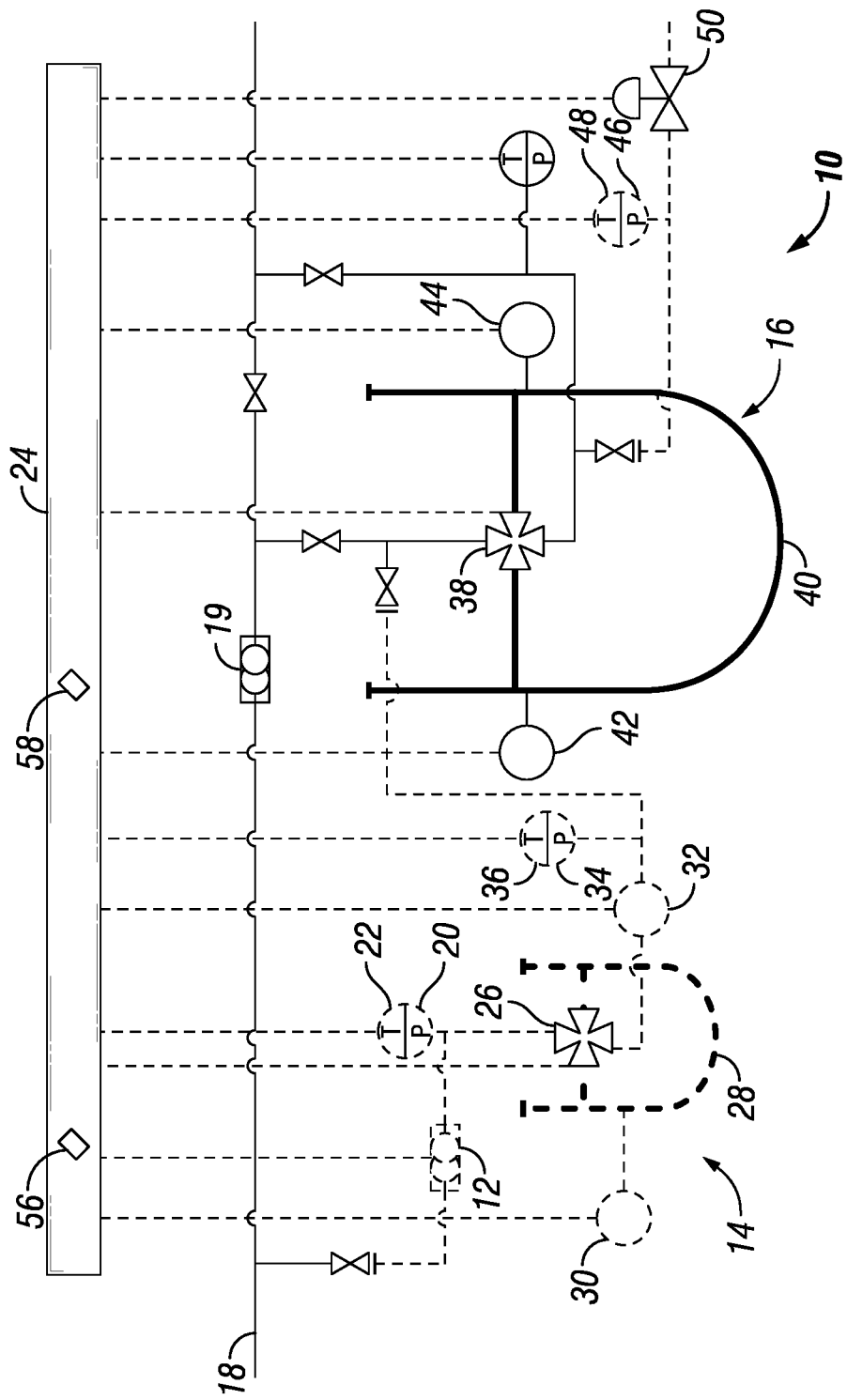
FIG. 2 is a schematic diagram of a prover calibration system in accordance with an embodiment of this disclosure.

Looking at FIGS. 1-2, prover calibration system 10 is a system for determining the accuracy of certain provers. Prover calibration system 10 includes transfer meter assembly 12, master prover 14, and field prover 16. Transfer meter assembly 12, master prover 14, and field prover 16 are each in fluid communication and are connected together in series. In the example configuration of FIG. 1, transfer meter assembly 12 is upstream of master prover 14, which in turn is upstream of field prover 16. In alternate embodiments, transfer meter assembly 12, master prover 14, and field prover 16 can be arranged in an alternate order while remaining connected in fluid communication in series. In the example embodiment of FIGS. 1-2, master prover 14 and field prover 16 are both bidirectional provers.

As shown in FIG. 1, prover calibration system 10 can be connected in series with pipeline 18 and each component of prover calibration system 10 can be permanent fixtures. As shown in FIG. 2, prover calibration system 10 can be connected in parallel with pipeline 18. In such an embodiment, the components of prover calibration system 10 that are shown in dashed lines are connected only to perform the calibration of field prover 16. Both transfer meter assembly 12 and master prover 14 can be connected only to perform the calibration of field prover 16 and then disconnected during regular operation of pipeline 18. Field prover 16 is a permanent fixture. Field prover 16 is used for measuring the accuracy of custody meter 19. Custody meter 19 can be used to measure the flow of hydrocarbons through pipeline 18.

Transfer meter assembly 12 can include a single transfer meter or can include two or more transfer meters that are connected in series. Each transfer meter can be a turbine type meter, a positive displacement type meter, or other type of flow meter known in the industry. Each transfer meter can provide pulses, as described in embodiments of this disclosure.

Transfer meter assembly 12 can be associated with transfer meter pressure transmitter 20 and transfer meter temperature transmitter 22. Transfer meter pressure transmitter 20 can detect a pressure of a fluid of transfer meter assembly 12. Transfer meter pressure transmitter 20 can further transmit such detected pressure to data acquisition system 24. Transfer meter temperature transmitter 22 can detect a temperature of the fluid of transfer meter assembly 12. Transfer meter temperature transmitter 22 can further transmit such detected temperature to data acquisition system 24.

Master prover 14 can be a displacement type prover. Master prover 14 can have a volume that is sufficient to collect 10000 pulses generated by transfer meter assembly 12 over the duration of the operation of one pass of master prover 14. Alternately, master prover 14 could have a volume that is sufficient to collect a number of pulses that are required for interpolation by data acquisition system 24 using a double chronometry method per API MPMS Chapter 4, Part 6—Pulse Interpolation. The double chronometry method is a pulse interpolation technique used to increase the readout discrimination level of flowmeter pulses detected between prover detector signals. This is accomplished by resolving these pulses into a whole number of pulses plus a fractional part of a pulse using two high speed timers and associated gating logic, controlled by the detector signals and the flowmeter pulses.

In the example configuration of FIG. 1, fluid flow from transfer meter assembly 12 flows through four way valve 26 of master prover 14 and be directed towards field prover 16.

In order to perform an operation for determining a base volume of field prover 16, master four way valve 26 can be moved so that fluid flow from pipeline 18 travels through calibrated section 28 of master prover 14 before being directed towards field prover 16. Calibrated section 28 of master prover 14 has a known master prover base prover volume (BPVmp). The BPVmp is the volume within the length of master prover 14 between first master switch 30 and second master switch 32.

First master switch 30 and second master switch 32 are in signal communication with data acquisition system 24. Data acquisition system 24 can detect when a displacer passes first master switch 30 and second master switch 32 so that a rate of flow and fluid volume through master prover 14 can be measured. The movement of the displacer between first master switch 30 and second master switch 32 is known as a pass of master prover 14. Movement of the displacer from first master switch 30 to second master switch 32 is known as a forward pass of master prover 14. Movement of the displacer from second master switch 32 to first master switch 30 is known as a back pass of master prover 14. In certain embodiments, master prover 14 can be bidirectional and capable of being utilized for fluid measurement purposes during a forward pass or during a back pass. In other embodiments, master prover 14 can be uni-directional and only capable of being utilized for fluid measurement purposes during a forward pass.

Master prover 14 can be associated with master prover pressure transmitter 34 and master prover temperature transmitter 36. Master prover pressure transmitter 34 can detect a pressure of a fluid of master prover 14. Master prover pressure transmitter 34 can further transmit such detected pressure to data acquisition system 24. Master prover temperature transmitter 36 can detect a temperature of the fluid of master prover 14. Master prover temperature transmitter 36 can further transmit such detected temperature to data acquisition system 24.

Field prover 16 can be a displacement type prover. In the example configuration of FIG. 1, fluid flow from master prover 14 flows through four way valve 26. Fluid flow from pipeline 18 can travel through transfer meter assembly 12, then through master prover 14 to reach field prover 16.

In order to perform an operation for determining a base prover volume of field prover 16, field four way valve 38 can be moved so that fluid flow from pipeline 18 travels through calibrated section 40 of field prover 16 before being directed downstream of prover calibration system 10. Calibrated section 40 of field prover 16 is the volume that will be calculated with systems and methods of this disclosure and will be known as field prover base prover volume (BPVfp). The BPVfp is the volume within the length of field prover 16 between first field switch 42 and second field switch 44.

First field switch 42 and second field switch 44 are in signal communication with data acquisition system 24. Data acquisition system 24 can detect when a displacer passes first field switch 42 and second field switch 44 so that the BPVfp can be calculated and a rate of flow through field prover 16 can be measured. The movement of the displacer between first field switch 42 and second field switch 44 is known as a pass of field prover 16. Movement of the displacer from first field switch 42 to second field switch 44 is known as a forward pass of field prover 16. Movement of the displacer from second field switch 44 to first field switch 42 is known as a back pass of field prover 16. In certain embodiments, field prover 16 can be bidirectional and capable of being utilized for fluid measurement purposes during a forward pass or during a back pass. In other embodiments, field prover 16 can be uni-directional and only capable of being utilized for fluid measurement purposes during a forward pass.

Field prover 16 has a volume that is larger than the volume of master prover 14. As an example, field prover 16 can have a sufficient volume so that master prover 14 can complete two or more complete passes of master prover 14 within the time required for field prover 16 to complete one pass of field prover 16 when master prover 14 and field prover 16 are operated at the same fluid flow rate.

Field prover 16 can be associated with field prover pressure transmitter 46 and field prover temperature transmitter 48. Field prover pressure transmitter 46 can detect a pressure of a fluid of field prover 16. Field prover pressure transmitter 46 can further transmit such detected pressure to data acquisition system 24. Field prover temperature transmitter 48 can detect a temperature of the fluid of field prover 16. Field prover temperature transmitter 48 can further transmit such detected temperature to data acquisition system 24.

Flow control valve 50 can be located downstream of field prover 16. Flow control valve 50 can be in signal communication with data acquisition system 24. Flow control valve 50 can be used to manage a rate of the flow of fluid through prover calibration system 10. After exiting field prover 16, the flow of fluid can pass through flow control valve 50 and be directed downstream of prover calibration system 10. The flow of fluid can be directed back into pipeline 18, or can be delivered to a reservoir or a drain.

In an example of operation, looking at FIGS. 1-4, prover calibration system 10 can be used to derive the base prover volume of field prover 16 by simultaneously operating field prover 16 and master prover 14 in series with transfer meter assembly 12.

Figure 3:
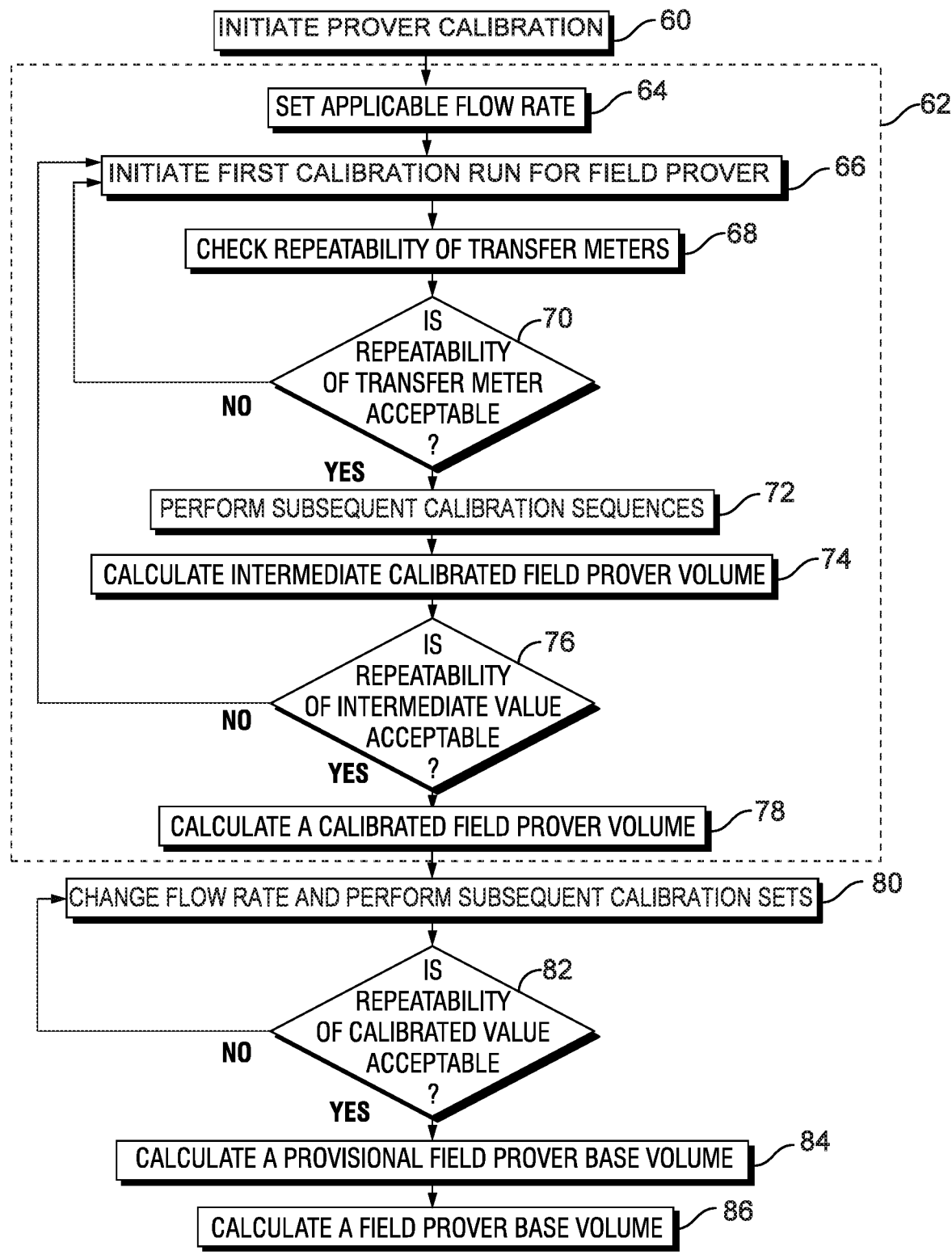
FIG. 3 is a flow chart showing steps of for deriving a base volume of a field prover, in accordance with an embodiment of this disclosure.

Looking at FIG. 3, an example embodiment of steps for deriving the base prover volume of field prover 16 by simultaneously operating field prover 16 and master prover 14 in series with transfer meter assembly 12 is provided. In step 60, the prover calibration can be initiated. The initiation of prover calibration of step 60 can include, for example, making up the connections required secure the component of prover calibration system 10 in place.

A calibration set can then be performed. A calibration set includes the steps located within the box of FIG. 3 labeled with the identifier 62. In step 64, a first flow rate can be selected and set. The setting of the applicable flow rate will include allowing the flow of fluid at the applicable flow rate to flow for a sufficient period of time so that the process parameters, such as temperate and pressure, stabilize and any entrapped air in the system is vented.

After the flow of fluid through prover calibration system 10 has been stabilized at the first flow rate, step 66 includes initiating the first calibration run for field prover 16. Master prover 14 and field prover 16 will be operating concurrently. Master prover 14 and field prover 16 will further be operating concurrently with transfer meter assembly 12, which will be generating pulses.

The repeatability of transfer assembly 12 can then be checked in step 68 in the same manner as described in step 108 below. In step 70, if the repeatability transfer meter value is outside of the required transfer meter repeatability tolerance, the calibration run can be repeated at the first flow rate, or at the applicable flow rate for which the repeatability transfer meter value is outside of the required transfer meter repeatability tolerance. If the repeatability transfer meter value is within the required transfer meter repeatability tolerance for a particular flow rate, such as the first flow rate, then subsequent calibration sequences can be run in step 72.

After performing the subsequent calibration sequences of step 72, intermediate calibrated field prover volume (ICPV) can be calculated in step 74, as is defined below in relation to step 112. The intermediate calibrated field prover volume can be calculated separately for each transfer meter of transfer meter assembly 12. The calibration sequence at the first flow rate, and at each subsequent flow rates, can be performed at least three times.

The repeatability intermediate value can be calculated in step 76. Step 116 described below can explain an example of such calculation. It can be determined if the repeatability intermediate value is within a required intermediate value repeatability tolerance in step 76.

If the repeatability intermediate value does not meet the repeatability criteria, the calibration run can be re-initiated in step 66 and steps 66 through 76 can be repeated. If the repeatability intermediate value meets the repeatability criteria, the calibrated field prover volume can be determined in step 78. After the calibrated field prover volume is determined in step 78, the flow rate can be changed by at least 25% in step 80 and subsequent calibration sets can be performed. The calibration sets can be repeated until the repeatability criteria for the calibrated field prover volume has been met, as determined in step 82. If the repeatability calibrated value does not meet the repeatability criteria, then the flow rate can be adjusted by at least 25% and the calibration set can be performed at the changed flow rate in step 80.

If the repeatability calibrated value meets the repeatability criteria, the provisional field prover base volume can be determined in step 84, as described in relation to step 124 below. After calculating the provisional field prover base volumes in step 84, the field prover base volume for field prover 16 can be calculated in step 86, as described in relation to step 126 below.

Figure 4:
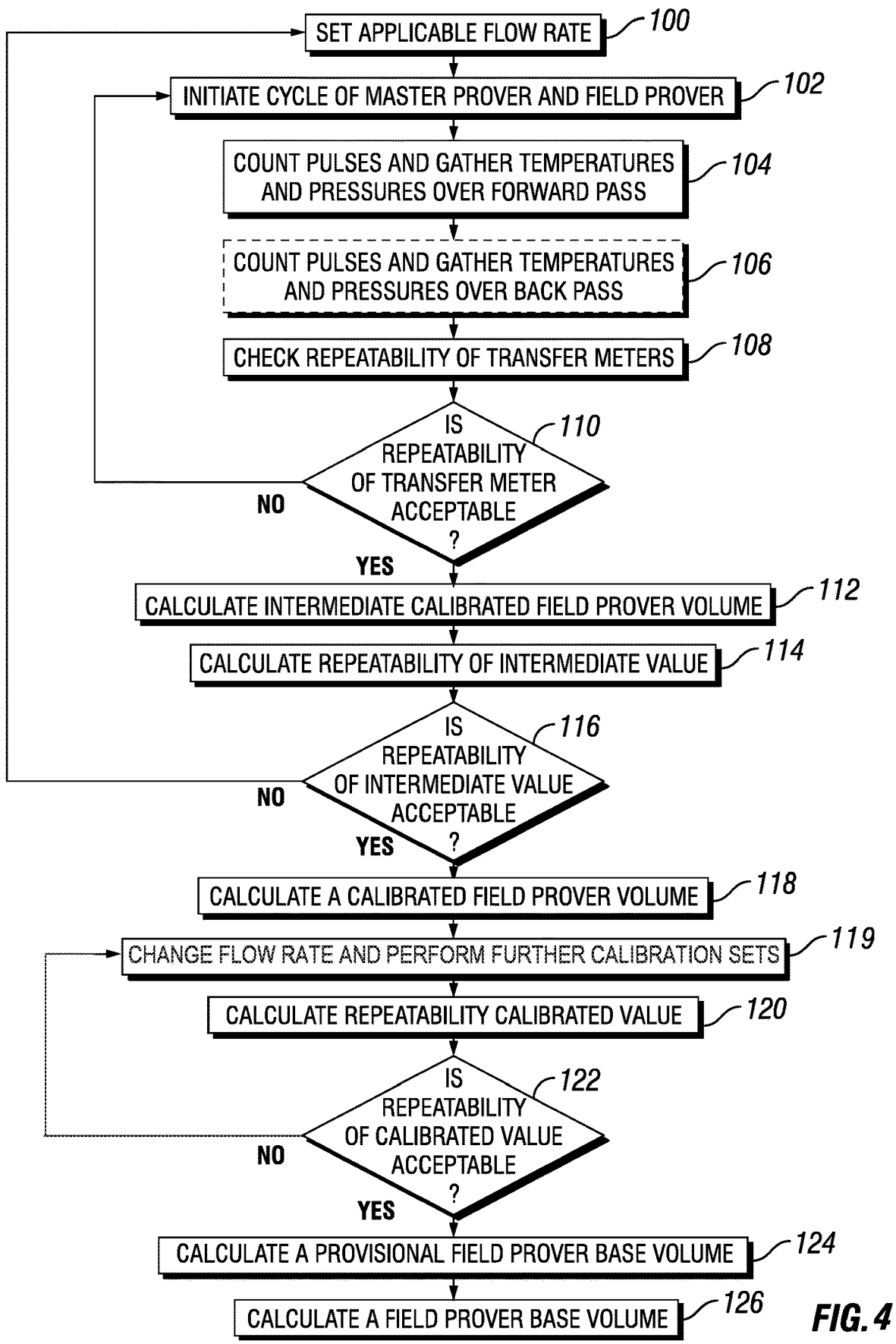
FIG. 4 is a flow chart showing alternate steps of for deriving a base volume of a field prover, in accordance with an embodiment of this disclosure.

In an alternate embodiment, in order to prepare for the calibration operation, looking at FIG. 4, step 100 includes setting an applicable flow rate. A first flow rate can be selected and flow control valve 50 can be operated to result in the first flow rate passing through prover calibration system 10. Flow control valve 50 can be operated by hand or can be signaled by data acquisition system 24 to manipulate the flow rate of the flow of fluids through prover calibration system 10. The same volumetric flow rate of the flow of fluids will be traveling through transfer meter assembly 12, master prover 14 and field prover 16. The setting of the applicable flow rate will include allowing the flow of fluid at the applicable flow rate to flow for a sufficient period of time so that the process parameters, such as temperate and pressure, stabilize and any entrapped air in the system is vented.

The fluid used for the flow of fluids through prover calibration system 10 can be fluid that is passing through pipeline 18 or can be fluid that is supplied from an external source outside of pipeline 18. The fluid used for the flow of fluids through prover calibration system 10 can be the same fluid as the process or production fluids that are passing through pipeline 18, can be a fluid that has characteristics similar to the process or production fluids that are passing through pipeline 18, or could be, for example, water. The fluid used for the flow of fluids through prover calibration system 10 should be a single phase liquid state fluid.

After the flow of fluid through prover calibration system 10 has been stabilized at the first flow rate, step 102 includes initiating the first pass of master prover 14 and field prover 16. Master prover 14 and field prover 16 will be operating concurrently. Master prover 14 and field prover 16 will further be operating concurrently with transfer meter assembly 12, which will be generating pulses.

FIG. 5 is a representative timeline of a single cycle of a calibration sequence of the procedure for determining the base prover volume of field prover 16. The testing time period is shown on the timeline as starting at start time To and extending to end cycle time Tc. The timeline of FIG. 5 shows the passes made by master prover 14 above the timeline and the pass made by the field prover 16 beneath the timeline.

Looking at FIG. 5, master prover 14 can complete two or more passes 52 over the duration of the testing time period. Field prover 16 makes only one pass 54 over the duration of the testing time period. In the example embodiment of FIG. 5, master prover 14 has made five passes 52A-52E over the testing time period for the cycle. In alternate examples, master prover 14 can make as few as two passes or can make more than five passes over the testing time period for the cycle.

Master prover 14 can make at least two full and complete passes 52 within the duration of the pass 54 of field prover 16. In the example embodiment of FIG. 5, master prover makes three full and complete passes 52B-52D within the duration of the pass 54 of field prover 16. In alternate embodiments, master prover 14 makes two full and complete passes 52 or can make more than three full and complete passes 52 within the duration of the pass 54 of field prover 16.

Looking at FIGS. 1-4, during the calibration sequence, as master prover 14 makes at least two forward and back passes and as field prover 16 is concurrently making a single forward pass, data acquisition system 24 is counting pulses generated by transfer meter assembly 12 in step 104. The pulses counted by data acquisition system 24 can be counted in whole number of pulses. In alternate embodiments, the number of pulses counted can be interpolated using double chronometry methodologies.

First pulse counter 56 counts pulses generated by transfer meter assembly 12 over the duration of each pass of master prover 14. The number of pulses generated by transfer meter assembly are counted separately for each pass of master prover 14. An average master prover pulse count of the pulses generated by transfer meter assembly 12 over the duration of each pass of master prover 14 can then be determined by averaging the pulses counted from each pass of master prover 14.

Second pulse counter 58 counts pulses generated by transfer meter assembly 12 over the duration of the single pass of field prover 16 to determine a field prover pulse count for the current cycle.

During the current cycle of the calibration sequence in step 104 as first pulse counter 56 and second pulse counter 58 are counting pulses, data acquisition system 24 is also collecting temperature and pressure data. Data acquisition system 24 can gather the pressure of the fluid of transfer meter assembly 12 from transfer meter pressure transmitter 20 and can gather the temperature of the fluid of transfer meter assembly 12 from transfer meter temperature transmitter 22. Data acquisition system 24 can also gather the pressure of the fluid of master prover 14 from master prover pressure transmitter 34 and can gather the temperature of the fluid of master prover 14 from master prover temperature transmitter 36. Data acquisition system 24 can further gather the pressure of the fluid of field prover 16 from field prover pressure transmitter 46 and can gather the temperature of the fluid of field prover 16 from field prover temperature transmitter 48.

In embodiments where transfer meter assembly 12 includes two or more transfer meters, the pulses generated by each transfer meter is counted separately. In such an embodiment, first pulse counter 56 will count pulses generated by each of the transfer meters over a duration of each pass of master prover 14. In such an embodiment, the average master forward prover pulse count of the pulses generated by each of the transfer meters separately over the duration of each forward pass of master prover 14 can then be determined by averaging the pulses counted from each forward pass of master prover 14 from each transfer meter separately. Therefore the number of average master forward prover pulse counts will be equal to the number of transfer meters that are part of transfer meter assembly 12.

In embodiments where transfer meter assembly 12 includes two or more transfer meters, second pulse counter will count pulses generated by each of the transfer meters separately over the duration of the forward pass of field prover 16 to determine a field prover forward pulse count for each of the transfer meters.

In embodiments where master prover 14 and field prover 16 are uni-directional, only forward passes of master prover 14 and field prover 16 are used. In such an embodiment, the displacer moves in a circulatory manner. API MPMS Chap 12.2 provides details on base prover volume calculation for bidirectional and uni-directional provers.

In embodiments where master prover 14 and field prover 16 are bidirectional, the cycle can be repeated in step 106 with back passes of both master prover 14 and field prover 16. In such an embodiment, as master prover 14 makes at least two back passes and as field prover 16 is concurrently making a single back pass, data acquisition system 24 is counting pulses generated by transfer meter assembly 12. First pulse counter 56 counts pulses generated by transfer meter assembly 12 over the duration of each back pass of master prover 14. The number of pulses generated by transfer meter assembly are counted separately for each back pass of master prover 14. An average back master prover pulse count of the pulses generated by transfer meter assembly 12 over the duration of each back pass of master prover 14 can then be determined by averaging the pulses counted from each back pass of master prover 14.

Second pulse counter 58 counts pulses generated by transfer meter assembly 12 over the duration of the single back pass of field prover 16 to determine a field prover back pulse count for the current cycle.

During the current cycle of the calibration sequence as first pulse counter 56 and second pulse counter 58 are counting pulses during back passes, data acquisition system 24 is also collecting temperature and pressure data. Data acquisition system 24 can gather the pressure of the fluid of transfer meter assembly 12 from transfer meter pressure transmitter 20 and can gather the temperature of the fluid of transfer meter assembly 12 from transfer meter temperature transmitter 22. Data acquisition system 24 can also gather the pressure of the flow of master prover 14 from master prover pressure transmitter 34 and can gather the temperature of the fluid of master prover 14 from master prover temperature transmitter 36. Data acquisition system 24 can further gather the pressure of the fluid of field prover 16 from field prover pressure transmitter 46 and can gather the temperature of the fluid of field prover 16 from field prover temperature transmitter 48.

In embodiments where transfer meter assembly 12 includes two or more transfer meters, the pulses generated by each transfer meter are counted separately. In such an embodiment, first pulse counter 56 will count pulses generated by each of the transfer meters over a duration of each back pass of master prover 14. In such an embodiment, the average master back prover pulse count of the pulses generated by each of the transfer meters separately over the duration of each back pass of master prover 14 can then be determined by averaging the pulses counted from each back pass of master prover 14 from each transfer meter separately. Therefore the number of average master back prover pulse counts will be equal to the number of transfer meters that are part of transfer meter assembly 12.

In embodiments where transfer meter assembly 12 includes two or more transfer meters, second pulse counter will count pulses generated by each of the transfer meters separately over the duration of the back pass of field prover 16 to determine a field prover back pulse count for each of the transfer meters.

The repeatability of transfer assembly 12 can then be checked in step 108 by calculating a percentage difference in pulse counts from each of the transfer meters of transfer meter assembly 12. A separate repeatability value can be calculated for each of the transfer meters. A separate repeatability value can be calculated for the forward pass and backward pass of the cycle.

Each calculated repeatability transfer meter value can be evaluated to determine if such repeatability transfer meter value is within a required transfer meter repeatability tolerance in step 110. A minimum of two runs or passes are required to calculate repeatability.

As an example, the repeatability transfer meter value (Rtmv) can be calculated as:

$$Rtmv(\%) = 100 \times \frac{\text{(highest pulses } per \text{ pass)} - \text{(lowest pulses } per \text{ pass)}}{\text{(lowest pulses } per \text{ pass)}}$$

Where the "highest pulses per pass" is the value of the highest number of counted pulses by first pulse counter 56 over a pass of master prover 14 and the "lowest pulses per pass" is the value of the lowest number of counted pulses by first pulse counter 56 over a pass of master prover 14.

If the repeatability transfer meter value is outside of the required transfer meter repeatability tolerance, the calibration sequence can be repeated at the first flow rate, or at the applicable flow rate for which the repeatability transfer meter value is outside of the required transfer meter repeatability tolerance. In certain embodiments, the repeatability transfer meter value can be 0.02%. In alternate embodiments, repeatability transfer meter value can be specified by the operator. The calibration sequence can be repeated until the repeatability transfer meter value is within the required transfer meter repeatability tolerance for such flow rate.

As used in this specification, the calibration sequence refers to the steps of: counting pulses generated by transfer meter assembly 12 with first pulse counter 56 over a duration of each pass of two or more passes of master prover 14; determining an average master prover pulse count of the pulses generated by transfer meter assembly 12 over the duration of each pass of two or more passes of master prover 14; counting pulses generated by transfer meter assembly 12 with second pulse counter 58 over the duration of a pass of field prover 16 to determine a field prover pulse count; and calculating the intermediate calibrated field prover volume.

If the repeatability transfer meter value is within the required transfer meter repeatability tolerance for a particular flow rate, such as the first flow rate, then an intermediate calibrated field prover volume can be determined directly in step 112 from a ratio of the field prover pulse count to the average master prover pulse count, multiplied by a base master prover volume.

As an example, the intermediate calibrated field prover volume (ICPV) can be calculated as:

$$ICPV = \frac{Nfp}{Nmp, ave} \times BPVmp \times \frac{CCFmp}{CCFfp}$$

Where Nfp is the number of pulses counted over the single pass of field prover 16 for the particular cycle. Nmp,ave is the number of pulses counted over each of the multiple passes of master prover 14, averaged, for the same cycle. BPVmp is the known base prover volume of the master prover. The units of ICPV will be the same as the units of BPVmp.

CCFmp is a combined correction factor for master prover for the effect of line pressure and temperature on fluid and prover steel. The CCFmp is calculated as:

CCFmp=CTSmp*CPSmp*CTLmp*CPLmp,

Where;
CTSmp: Correction Factor for effect of line temperature on the master prover steel
CPSmp: Correction Factor for effect of line pressure on the master prover steel
CTLmp: Correction Factor for effect of line temperature on the fluid in the master prover
CPLmp: Correction Factor for effect of line pressure on the fluid in the master prover CCFfp is a combined correction factor for field prover for the effect of line pressure and temperature on fluid and prover steel. The CCFfp is calculated as:

CCFfp=CTSfp*CPSfp*CTLfp*CPLfp,

Where;
CTSfp: Correction Factor for effect of line temperature on the field prover steel
CPSfp: Correction Factor for effect of line pressure on the field prover steel
CTLfp: Correction Factor for effect of line temperature on the fluid in the field prover
CPLfp: Correction Factor for effect of line pressure on the fluid in the field prover CCFmp and CCFfp are used to adjust the ICPV for temperature and pressure differences between the fluid at master prover 14 and the fluids at field prover 16.

The intermediate calibrated field prover volume can be calculated separately for each transfer meter of transfer meter assembly 12. As an example, if there are two transfer meters, then there would be two separate pulse counts during each pass of master prover 14 and field prover 16. The pulses generated by the first transfer meter would be counted and used to calculate an intermediate calibrated field prover volume for such first transfer meter. The pulses generated by the second transfer meter would be counted and used to calculate an intermediate calibrated field prover volume for such second transfer meter. Therefore the number of intermediate calibrated field prover volumes calculated would be equal to the number of transfer meters of transfer meter assembly 12.

In embodiments where master prover 14 and field prover 16 are bidirectional, separate intermediate calibrated field prover volumes can be calculated for the forward passes and for the back passes. The intermediate calibrated field prover volume calculated for a forward pass can be known as a forward intermediate calibrated field prover volume and an intermediate calibrated field prover volume calculated for a back pass can be known as a back intermediate calibrated field prover volume. An intermediate calibrated field prover volume for each of the transfer meters can be calculated by summing the forward intermediate calibrated field prover volume and the back intermediate calibrated field prover volume for such transfer meter. Therefore, the number of intermediate calibrated field prover volume values will be equal to the number of transfer meters.

The calibration sequence at the first flow rate, and at each subsequent flow rates, can be performed at least three times. The intermediate calibrated field prover volume can be calculated at such flow rate for each of the calibration sequences to provide at least three intermediate calibrated field prover volumes at such flow rate. For each calibration sequence, the separate average intermediate calibrated field prover volume from each transfer meter can be determined to provide at least three separate average intermediate calibrated field prover volumes at the relevant flow rate for each transfer meter of transfer meter assembly 12.

A percentage difference in the intermediate calibrated field prover volume for consecutive calibration sequences can be calculated in step 114 to arrive at a repeatability intermediate value to confirm that the calibration cycles meet industry repeatability requirements. The repeatability intermediate value can be evaluated to determine if the repeatability intermediate value is within a required intermediate value repeatability tolerance in step 116. As an example, the API can require up to maximum six consecutive calibration runs to have three consecutive sets with a repeatability intermediate value within 0.02%. In such an example, the required intermediate value repeatability tolerance is 0.02%.

In embodiments where master prover 14 and field prover 16 are bidirectional the repeatability intermediate value can be calculated as a percentage difference in the average intermediate calibrated field prover volume for each transfer meter for consecutive calibration sequences. In such an embodiment, the repeatability intermediate value can again be calculated for each transfer meter.

As an example, the repeatability intermediate value (Ricpv) can be calculated as:

$$Ricpv(\%) = 100 \times \frac{(\text{higher } ICPV) - (\text{lower } ICPV)}{(\text{lower } ICPV)}$$

Where the "higher ICPV" is the value of the higher ICPV calculated in consecutive calibration sequences and the "lower ICPV" is the value of the lower ICPV calculated in consecutive calibration sequences. If the repeatability intermediate value is outside of the required intermediate value repeatability tolerance for a flow rate, for any transfer meter then the calibration sequence can be repeated at such flow rate.

The calibration sequence can be repeated until the repeatability criteria has been met. As an example, in accordance with certain API criteria requirements, the calibration sequence can be repeated up to six consecutive calibration runs at the same flow rate until there has been three consecutive sets with a repeatability intermediate value within 0.02%.

If the repeatability intermediate value meets the repeatability criteria, the calibrated field prover volume can be determined in step 118. As an example, if there have been three consecutive calibration sequences with a repeatability intermediate value within 0.02%, then the calibrated field prover volume can be determined for the current flow rate. In alternate examples, other repeatability requirements may be applicable.

The calibrated field prover volume can be calculated from the average of the intermediate calibrated field prover volume values from the calibration sequences that met the repeatability requirements. As an example, if the repeatability requirement includes having three consecutive sets with a repeatability intermediate value within 0.02%, then the intermediate calibrated field prover volume values from such consecutive sets would be averaged to arrive at the calibrated field prover volume. The calibrated field prover volume values is calculated for each transfer meter of transfer meter assembly 12. Therefore, the number of calibrated field prover volume values will be equal to the number of transfer meters.

As an example, the calibrated field prover volume (CPV) for a particular flow rate can be calculated as:

$$CPV = \frac{\Sigma_0^x ICPV}{x}$$

Where x is the number of intermediate calibrated field prover volumes that are being averaged together. As an example, if the repeatability requirement includes having three consecutive calibration sequences with a repeatability intermediate value within 0.02%, then the number of intermediate calibrated field prover volumes that are being averaged together is three and x will be equal to three.

After calculating the calibrated field prover volume in step 118, the flow rate can be changed by at least 25% and further calibration sequences can be performed in step 119.

A percentage difference in the calibrated field prover volume can be calculated in step 120 to arrive at a repeatability calibrated value to confirm that the calibration cycles meet industry repeatability requirements. The repeatability calibrated value can be evaluated to determine if the repeatability calibrated value is within a required calibrated value repeatability tolerance in step 122. As an example, up to maximum six consecutive calibrated value sets with flow rates that differ by at least 25%, until there has been three consecutive calibrated value sets with a repeatability calibrated value within 0.02%. In such an example, the required calibrated value repeatability tolerance is 0.02%.

As used in this specification, a calibrated value set includes the steps of performing multiple calibration sequences until the repeatability intermediate value meets the repeatability criteria, and calculating the calibrated field prover volume.

As an example, the repeatability calibrated value (Rcpv) can be calculated as:

$$Rcpv(\%) = 100 \times \frac{(\text{higher } CPV) - (\text{lower } CPV)}{(\text{lower } CPV)}$$

Where the "higher CPV" is the value of the higher CPV calculated in consecutive calibrated value sets and the "lower CPV" is the value of the lower CPV calculated in consecutive calibrated value sets. A first calibrated value set can be compared to a second calibrated value set. If the repeatability calibrated value meets the repeatability criteria then a third calibrated value set can be run. After the third run, the repeatability calibrated value is determined for all three runs based on the higher CPV and the lower CPV of all three runs.

The calibrated value set can be repeated until the repeatability criteria for the calibrated field prover volume has been met. As an example, in accordance with certain API criteria requirements, the calibrated value set can be repeated for up to six consecutive calibration runs at flow rates that differ by at least 25% until there has been three consecutive calibrated value sets with a repeatability calibrated value within 0.02%. In alternate examples, other repeatability requirements may be applicable.

If the repeatability calibrated value does not meet the repeatability criteria, then the flow rate can be adjusted by at least 25% to provide a changed flow rate in step 119 and the calibration sequence and calibrated value set can be performed at the changed flow rate.

If the repeatability calibrated value meets the repeatability criteria, the provisional field prover base volume can be determined in step 124. As an example, the provisional field prover volume (BPVp) can be calculated as:

$$BPVp = \frac{\Sigma_0^y CPV}{y}$$

Where y is the number of calibrated field prover volumes that are being averaged together. As an example, if the repeatability requirement includes having three consecutive calibrated value sets with a repeatability intermediate value within 0.02%, then the number of calibrated field prover volumes that are being averaged together is three and y will be equal to three. The provisional field prover volume value is calculated for each transfer meter of transfer meter assembly 12. Therefore, the number of provisional field prover volumes will be equal to the number of transfer meters.

After calculating the provisional field prover base volumes, the field prover base volume for field prover 16 can be calculated in step 126. The field prover volume (BPV) can be calculated as:

$$BPV = \frac{\Sigma_0^z BPVp}{z}$$

Where z is the number of provisional field prover base volumes that are being averaged together. As an example, if there are five transfer meters of transfer meter assembly 12 then the number of provisional field prover base volumes that are being averaged together is five and z will be equal to five. If there is only one transfer meter, then the one provisional field prover base volume will be equal to the field prover volume.

Systems and method of this disclosure therefore provide methods and systems for determining a base field prover volume with a reduced calibration time, reduced complexity of the calculations, and reduced uncertainty compared to some current systems.

Embodiments described herein, therefore, are well adapted to carry out the objects and attain the ends and advantages mentioned, as well as others inherent therein. While certain embodiments have been described for purposes of disclosure, numerous changes exist in the details of procedures for accomplishing the desired results. These and other similar modifications will readily suggest themselves to those skilled in the art, and are intended to be encompassed within the scope of the present disclosure disclosed herein and the scope of the appended claims.

What is claimed is:

1. A method for determining a base field prover volume of a field prover, the method including:
   connecting together a transfer meter assembly, a master prover, and the field prover in fluid communication in series, where the transfer meter assembly includes two or more transfer meters;
   providing a flow of fluid at a first flow rate through the transfer meter assembly, the master prover, and the field prover;
   performing a calibration sequence at the first flow rate, the calibration sequence including:
      counting pulses generated by the transfer meter assembly with a first pulse counter over a duration of each pass of two or more passes of the master prover;
      determining an average master prover pulse count of the pulses generated by the transfer meter assembly over the duration of each pass of two or more passes of the master prover;
      counting pulses generated by the transfer meter assembly with a second pulse counter over a duration of a pass of the field prover to determine a field prover pulse count; and
      calculating an intermediate calibrated field prover volume from a ratio of the field prover pulse count to the average master prover pulse count, multiplied by a base master prover volume;
   repeating the performing of the calibration sequence at the first flow rate at least three times and providing the intermediate calibrated field prover volume at the first flow rate for each of the calibration sequences to provide at least three intermediate calibrated field prover volumes at the first flow rate;
   calculating a first calibrated field prover volume from an average of each of the at least three intermediate calibrated field prover volumes at the first flow rate;
   performing the calibration sequence at a second flow rate, where a percentage difference between the second flow rate and the first flow rate is at least 25%;
   repeating the performing of the calibration sequence at the second flow rate at least three times and providing the intermediate calibrated field prover volume at the second flow rate for each of the calibration sequences to provide at least three intermediate calibrated field prover volumes at the second flow rate;
   calculating a second calibrated field prover volume from the average of each of the at least three intermediate calibrated field prover volumes at the second flow rate;
   performing the calibration sequence at a third flow rate, where a percentage difference between the third flow rate and the second flow rate is at least 25%;
   repeating the performing of the calibration sequence at the third flow rate at least three times and providing the intermediate calibrated field prover volume at the third flow rate for each of the calibration sequences to provide at least three intermediate calibrated field prover volumes at the third flow rate;
   calculating a third calibrated field prover volume from the average of each of the at least three intermediate calibrated field prover volumes at the third flow rate;
   determining a provisional field prover base volume from the average of the first calibrated field prover volume, the second calibrated field prover volume, and the third calibrated field prover volume; and
   determining a field prover base volume from the provisional field prover base volume.

2. The method of claim 1, where the calibration sequence further includes measuring a master prover temperature of the fluid at the master prover, measuring a master prover pressure of the fluid at the master prover, measuring a field prover temperature of the fluid at the field prover, and measuring a field prover pressure of the fluid at the field prover.

3. The method of claim 2, where calculating the intermediate calibrated field prover volume includes adjusting the intermediate calculated field prover volume with the master prover temperature, the master prover pressure, the field prover temperature and the field prover pressure.

4. The method of claim 1, where:
   counting pulses generated by the transfer meter assembly includes counting pulses generated by each of the transfer meters of the transfer meter assembly with the first pulse counter over the duration of each pass of two or more passes of the master prover;
   determining the average master prover pulse count of the pulses generated by the transfer meter assembly includes determining a separate average master prover pulse count by each of the transfer meters of the transfer meter assembly over the duration of each pass of two or more passes of the master prover;

counting pulses generated by the transfer meter assembly with the second pulse counter includes counting pulses generated by each of the transfer meters of the transfer meter assembly with the second pulse counter over the duration of the pass of the field prover to determine a separate field prover pulse count from each of the transfer meters of the transfer meter assembly;

calculating the intermediate calibrated field prover volume includes calculating a separate intermediate calibrated field prover volume from each transfer meter of the transfer meter assembly from a ratio of the field prover pulse count to average master prover pulse count from such transfer meter, multiplied by the base master prover volume, so that a number of calculated intermediate calibrated field prover volumes is equal to a number of transfer meters of the transfer meter assembly;

calculating the first calibrated field prover volume includes calculating a separate first calibrated field prover volume from the average of each of the at least three intermediate calibrated field prover volumes at the first flow rate from each transfer meter of the transfer meter assembly;

calculating the second calibrated field prover volume includes calculating a separate second calibrated field prover volume from the average of each of the at least three intermediate calibrated field prover volumes at the second flow rate from each transfer meter of the transfer meter assembly;

calculating the third calibrated field prover volume includes calculating a separate third calibrated field prover volume from the average of each of the at least three intermediate calibrated field prover volumes at the third flow rate from each transfer meter of the transfer meter assembly;

determining the provisional field prover base volume includes determining a separate provisional field prover base volume from the average of the first calibrated field prover volume, the second calibrated field prover volume, and the third calibrated field prover volume from each transfer meter of the transfer meter assembly; and determining the field prover base volume from the provisional field prover base volume includes determining the field prover base volume from the average of the provisional field prover base volume from each transfer meter of the transfer meter assembly.

5. The method of claim 1, further including before calculating the intermediate calibrated field prover volume, calculating a percentage difference in pulse counts from the transfer meter assembly by the first pulse counter to arrive at a repeatability transfer meter value and determining if the repeatability transfer meter value is within a required transfer meter repeatability tolerance.

6. The method of claim 5, further including if the repeatability transfer meter value is outside of the required transfer meter repeatability tolerance for a flow rate, then repeating the performing of the calibration sequence at such flow rate.

7. The method of claim 1, further including calculating a percentage difference in the intermediate calibrated field prover volume for consecutive calibration sequences to arrive at a repeatability intermediate value and determining if the repeatability intermediate value is within a required intermediate value repeatability tolerance.

8. The method of claim 7, further including if the repeatability intermediate value is outside of the required intermediate value repeatability tolerance for a flow rate, then repeating the performing of the calibration sequence at such flow rate.

9. The method of claim 1, further including before determining a provisional field prover base volume calculating a percentage difference between a largest value of the first calibrated field prover volume, the second calibrated field prover volume, and the third calibrated field prover volume, and a smallest value of the first calibrated field prover volume, the second calibrated field prover volume, and the third calibrated field prover volume, to arrive at a repeatability calibrated value and determining if the repeatability calibrated value is within a required calibrated value repeatability tolerance.

10. The method of claim 9, further including if the repeatability calibrated value is outside of the required calibrated value repeatability tolerance for a flow rate, then changing the flow rate by at least 25% to provide a changed flow rate and performing the calibration sequence at the changed flow rate.

11. The method of claim 1, where counting pulses with the first pulse counter over the duration of each pass of two or more passes of the master prover includes counting pulses with the first pulse counter over a duration of at least two passes of the master prover.

12. The method of claim 1, where counting pulses with the first pulse counter over the duration of each pass of two or more passes of the master prover occurs within the duration of the pass of the field prover.

13. A method for determining a base field prover volume of a field prover, the method including the steps of:
A—providing a first flow rate of a fluid flow through a prover calibration system, the prover calibration system including a transfer meter assembly, a master prover, and the field prover in fluid communication in series, where the transfer meter assembly includes at least one transfer meters, and where the fluid flow passes through each of the transfer meter assembly, the master prover, and the field prover;
B—counting pulses generated by each of the transfer meters separately with a first pulse counter over a duration of each pass of two or more forward passes of the master prover;
C—determining an average master forward prover pulse count of the pulses generated by each of the transfer meters separately over the duration of each pass of two or more forward passes of the master prover;
D—simultaneously with counting the pulses generated by each of the transfer meters separately with the first pulse counter over a duration of each pass of two or more forward passes of the master prover, counting pulses generated by each of the transfer meters separately with a second pulse counter over a duration of a forward pass of the field prover to determine a field prover forward pulse count for each of the transfer meters;
E—counting pulses generated by each of the transfer meters separately with the first pulse counter over a duration of each pass of two or more back passes of the master prover;
F—determining an average master back prover pulse count of the pulses generated by each of the transfer meters separately over the duration of each pass of two or more back passes of the master prover;
G—simultaneously with counting pulses generated by each of the transfer meters separately with the first pulse counter over a duration of each pass of two or more back passes of the master prover, counting pulses generated by each of the transfer meters separately with the second pulse counter over a duration of a back pass of the field prover to determine a field prover back pulse count for each of the transfer meters;

H—calculating a percentage difference in pulse counts from the first pulse counter for each of the transfer meters to arrive at a separate repeatability transfer meter value for each of the transfer meters and determining if each of the separate repeatability transfer meter values is within a required transfer meter repeatability tolerance I—calculating a separate forward intermediate calibrated field prover volume from each of the transfer meters from a ratio of the field prover forward pulse count to the average master forward prover pulse count for such transfer meter, multiplied by a base master prover volume;

J—calculating a separate back intermediate calibrated field prover volume from each of the transfer meters from a ratio of the field prover back pulse count to the average master back prover pulse count for such transfer meter, multiplied by the base master prover volume;

K—determining a separate average intermediate calibrated field prover volume from each of the transfer meters by addition of the forward intermediate calibrated field prover volume and the back intermediate calibrated field prover volume for such transfer meter;

L—repeating steps B-K at the first flow rate at least three times and providing the separate average intermediate calibrated field prover volume from each transfer meter at the first flow rate for each of the calibration sequences to provide at least three average intermediate calibrated field prover volumes at the first flow rate for each transfer meter;

M—calculating a percentage difference in the separate average intermediate calibrated field prover volume for each transfer meter for consecutive calibration sequences to arrive at a repeatability intermediate value for each transfer meter and determining if the repeatability intermediate value for each transfer meter is within a required intermediate value repeatability tolerance;

N—calculating a separate first calibrated field prover volume for each transfer meter from an average of each of the at least three average intermediate calibrated field prover volumes for each transfer meter at the first flow rate;

O—repeating steps B-M at a second flow rate, where a percentage difference between the second flow rate and the first flow rate is at least 25%;

P—calculating a separate second calibrated field prover volume for each transfer meter from the average of each of the at least three average intermediate calibrated field prover volumes for each transfer meter at the second flow rate;

Q—repeating steps B-M at a third flow rate, where a percentage difference between the third flow rate and the second flow rate is at least 25%;

R—calculating a separate third calibrated field prover volume for each transfer meter from the average of each of the at least three average intermediate calibrated field prover volumes for each transfer meter at the third flow rate;

S—calculating a separate percentage difference between a largest value of the first calibrated field prover volume, the second calibrated field prover volume, and the third calibrated field prover volume from each transfer meter, and a smallest value of the first calibrated field prover volume, the second calibrated field prover volume, and the third calibrated field prover volume from each transfer meter, to arrive at a separate repeatability calibrated value for each transfer meter and determining if the repeatability calibrated value for each transfer meter is within a required calibrated value repeatability tolerance;

T—determining a separate provisional field prover base volume from the average of the first calibrated field prover volume, the second calibrated field prover volume, and the third calibrated field prover volume from each transfer meter; and U—determining a field prover base volume by calculating the average of each separate provisional field prover base volume from each transfer meter.

14. The method of claim 13, further including measuring a master prover temperature of the fluid at the master prover, measuring a master prover pressure of the fluid at the master prover, measuring a field prover temperature of the fluid at the field prover, and measuring a field prover pressure of the fluid at the field prover.

15. The method of claim 14, where Step I includes adjusting each separate forward intermediate calibrated field prover volume with the master prover temperature, the master prover pressure, the field prover temperature, and the field prover pressure.

16. The method of claim 14, where Step J includes adjusting each separate back intermediate calibrated field prover volume with the master prover temperature, the master prover pressure, the field prover temperature, and the field prover pressure.

17. The method of claim 13, further including if the repeatability transfer meter value for any of the transfer meters is outside of the required transfer meter repeatability tolerance for a flow rate, then repeating Steps B-G.

18. The method of claim 13, further including if the repeatability intermediate value for any transfer meter is outside of the required intermediate value repeatability tolerance for a flow rate, then repeating Steps B-L for such flow rate.

19. The method of claim 13, further including if the repeatability calibrated value for any transfer meter is outside of the required calibrated value repeatability tolerance for a flow rate, then changing the flow rate by at least 25% to provide a changed flow rate and performing Steps B-R at the changed flow rate.

20. A system for determining a base field prover volume of a field prover, the system including:
   a transfer meter assembly, where the transfer meter assembly includes two or more transfer meters connected in series;
   a master prover, the master prover connected in fluid communication in series with the transfer meter assembly;
   the field prover connected in fluid communication in series with the master prover;
   a data acquisition system, the data acquisition system having a first pulse counter and a second pulse counter, where the first pulse counter is operable to count pulses generated by the transfer meter assembly over a duration of each pass of two or more passes of the master prover, and where the second pulse counter is operable to count pulses generated by the transfer meter assembly over a duration of a pass of the field prover;

a master prover pressure transmitter operable to detect a pressure of a fluid of the master prover and transmit the pressure of the fluid of the master prover to the data acquisition system;

a master prover temperature transmitter operable to detect and transmit a temperature of the fluid of the master prover and transmit the temperature of the fluid of the master prover to the data acquisition system;

a field prover pressure transmitter operable to detect a pressure of a fluid of the field prover and transmit the pressure of the fluid of the field prover to the data acquisition system; and a field prover temperature transmitter operable to detect a temperature of the fluid of the field prover and transmit the temperature of the fluid of the field prover to the data acquisition system.

\* \* \* \* \*